(12) United States Patent
Chimitt et al.

(10) Patent No.: US 7,684,529 B2
(45) Date of Patent: Mar. 23, 2010

(54) INTERFERENCE REJECTION IN WIRELESS NETWORKS

(75) Inventors: William J. Chimitt, Folsom, CA (US); Sudhakar Kalluri, Folsom, CA (US); Keith Holt, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1004 days.

(21) Appl. No.: 11/137,940

(22) Filed: May 26, 2005

(65) Prior Publication Data

US 2006/0269023 A1 Nov. 30, 2006

(51) Int. Cl.
*H04B 1/10* (2006.01)
(52) U.S. Cl. ........................................ 375/350
(58) Field of Classification Search ................ 375/350, 375/262, 267; 455/454
See application file for complete search history.

(56) References Cited

U.S. PATENT DOCUMENTS

| | | | |
|---|---|---|---|
| 7,068,977 B1* | 6/2006 | Yang et al. ............... | 455/67.13 |
| 7,203,249 B2* | 4/2007 | Raleigh et al. ............. | 375/299 |
| 2003/0072255 A1* | 4/2003 | Ma et al. ..................... | 370/208 |
| 2003/0125040 A1* | 7/2003 | Walton et al. ............... | 455/454 |
| 2005/0128966 A1* | 6/2005 | Yee .......................... | 370/310 |
| 2006/0140256 A1* | 6/2006 | Obernosterer et al. ....... | 375/148 |
| 2007/0223358 A1* | 9/2007 | Visoz et al. ................. | 370/201 |

\* cited by examiner

*Primary Examiner*—David C Payne
*Assistant Examiner*—Tanmay K Shah
(74) *Attorney, Agent, or Firm*—Dana B. Lemoine; Lemoine Patent Services, PLLC

(57) ABSTRACT

The effects of interference are mitigated in a wireless system by estimating spatial characteristics of an interfering signal, and using those characteristics in the formation of a spatial equalizer.

11 Claims, 7 Drawing Sheets

INTERFERENCE REJECTION IN WIRELESS NETWORKS

FIELD

The present invention relates generally to wireless communications, and more specifically to interference rejection in wireless networks.

BACKGROUND

Various types of wireless communications devices are becoming commonplace. For example, increasing numbers of wireless telephones, two-way radios, and wireless network devices are being used every day. With the proliferation of wireless communications devices comes the increased likelihood that they may interfere with each other. For example, wireless network devices may be subject to interference caused by other wireless network devices. Also for example, wireless network devices may be subject to interference caused by wireless communications devices other than wireless network devices.

Interference may also be caused by devices other than wireless communications devices. For example, wireless network devices may be subject to interference caused by spurious emissions from appliances such as microwave ovens. Many other types of devices may cause interference to wireless network devices.

DESCRIPTION OF EMBODIMENTS

Figure 1:
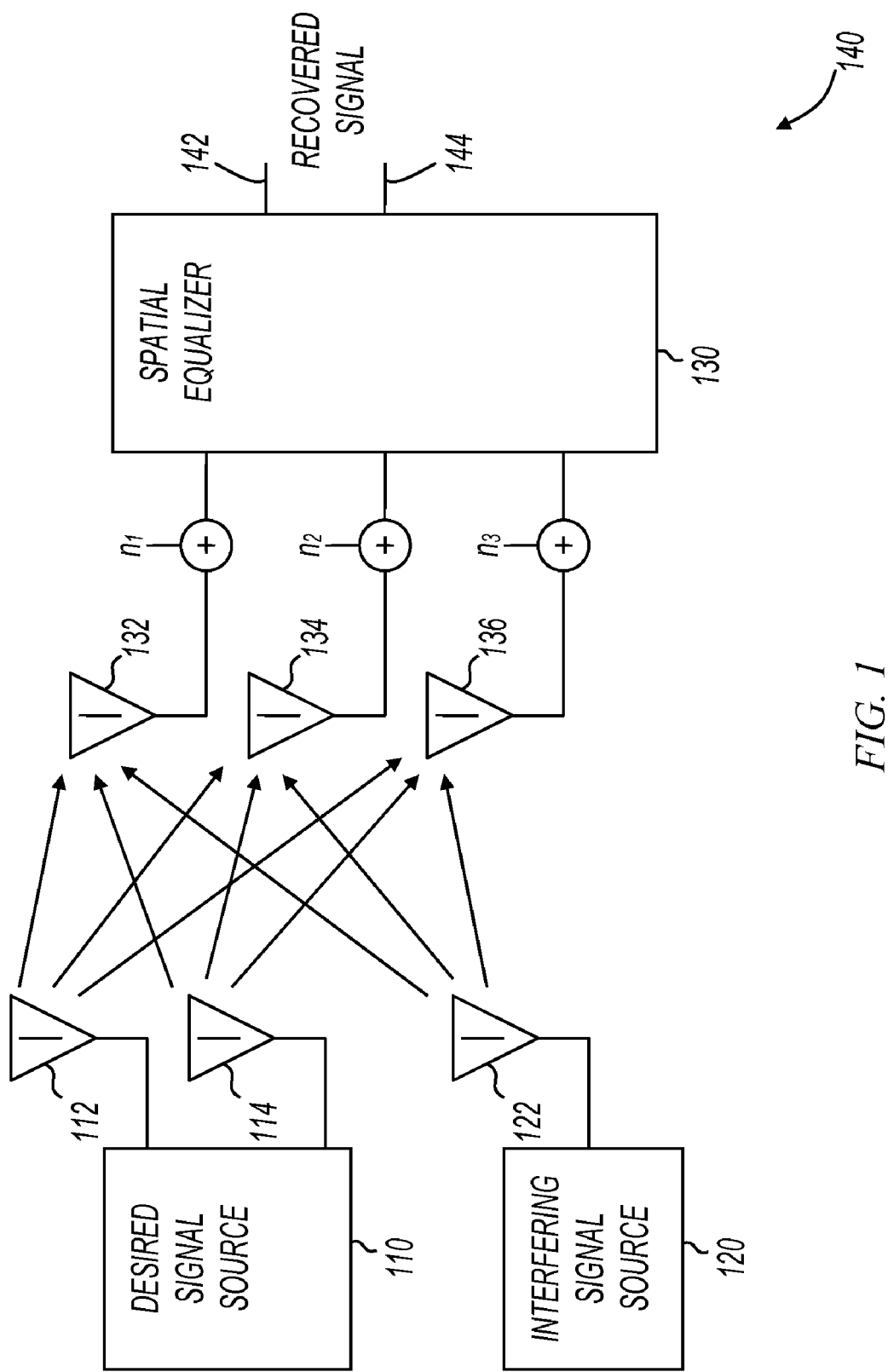
FIG. 1 shows a receiver and two signal sources.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a receiver and two signal sources. Receiver 140 is shown receiving a desired signal from desired signal source 110, and receiving an interfering signal from interfering signal source 120. Receiver 140 is shown having three antennas 132, 134, and 136. Desired signal source 110 is shown having two antennas 112 and 114, and interfering signal source is shown having one antenna 122.

In some embodiments, receiver 140 and desired signal source 110 are part of a wireless local area network (WLAN). For example, one or both of receiver 140 and desired signal source 110 may be an access point in a WLAN. Also for example, one or both of receiver 140 and desired signal source 110 may be a mobile station such as a laptop computer, personal digital assistant (PDA), or the like. Further, in some embodiments, receiver 140 and desired signal source 110 are part of a wireless wide area network (WWAN). For example, one or more of receiver 140 and desired signal source 110 may be a base station or a subscriber unit.

In some embodiments, receiver 140 and desired signal source 110 may operate partially in compliance with, or completely in compliance with, a wireless network standard. For example, receiver 140 and desired signal source 110 may operate partially in compliance with a standard such as ANSI/IEEE Std. 802.11, 1999 Edition, although this is not a limitation of the present invention. As used herein, the term "802.11" refers to any past, present, or future IEEE 802.11 standard, including, but not limited to, 802.11a, 802.11b, 802.11g, 802.11n, and others. Also for example, receiver 140 and desired signal source 110 may operate partially in compliance with any other standard, such as any IEEE wireless wide area network (WWAN) standard.

Various embodiments of the present invention are described with respect to the operation of an 802.11 compatible wireless network, although this is not a limitation of the present invention. The various methods, apparatus, and systems of the present invention may be applied to wireless communications and wireless networks other than 802.11 compatible wireless networks.

The "channel" through which desired signal source 110 and receiver 140 communicate may include many possible signal paths. For example, when desired signal source 110 and receiver 140 are in an environment with many "reflectors" (e.g. walls, doors, or other obstructions), many signals may arrive from different paths. This condition is known as "multipath." In some embodiments, desired signal source 110 and receiver 140 utilize multiple antennas to take advantage of the multipath and to increase the communications bandwidth. For example, in some embodiments, desired signal source 110 and receiver 140 may communicate using Multiple-Input-Multiple-Output (MIMO) techniques. In general, MIMO systems offer higher capacities by utilizing multiple spatial channels made possible by multipath.

In some embodiments, desired signal source 110 and receiver 140 may communicate using orthogonal frequency division multiplexing (OFDM) in each spatial channel. Multipath may introduce frequency selective fading which may cause impairments like inter-symbol interference (ISI). OFDM is effective at combating frequency selective fading in part because OFDM utilizes multiple frequency sub-carriers in each spatial channel such that the spectrum occupied by each sub-carrier exhibits a more flat channel characteristic. Scaling appropriate for each sub-carrier may be implemented to correct any sub-carrier attenuation. Further, the data carrying capacity of each sub-carrier may be controlled dynamically depending on the fading characteristics of the spectrum occupied by the sub-carrier.

Signals emitted from interfering signal source 120 may interfere with communications between desired signal source 110 and receiver 140. For example, interfering signal source 120 may represent adjacent channel energy from an 802.11 transmitter, co-channel energy from an 802.11 transmitter in a different basic service set (BSS), platform noise, or any other noise source, narrowband or wideband, whose statistics can be considered stationary relative to the life of an 802.11 packet.

Various embodiments of the present invention mitigate the interference described above using various techniques. In some embodiments, receiver 140 may collect information about the interfering signal, and use this information to generate coefficients for spatial equalizer 130. Spatial equalizer 130 receives signal energy from the three antennas 132, 134, and 136 plus spatially uncorrelated white noise shown as $n_1$, $n_2$, and $n_3$. Spatial equalizer 130 reduces the effects of interference caused by interfering signal source 120, and recovers and separates the desired signals from each other at 142 and 144. The recovered signal corresponds to the desired signals transmitted by antennas 112 and 114.

Figure 2:
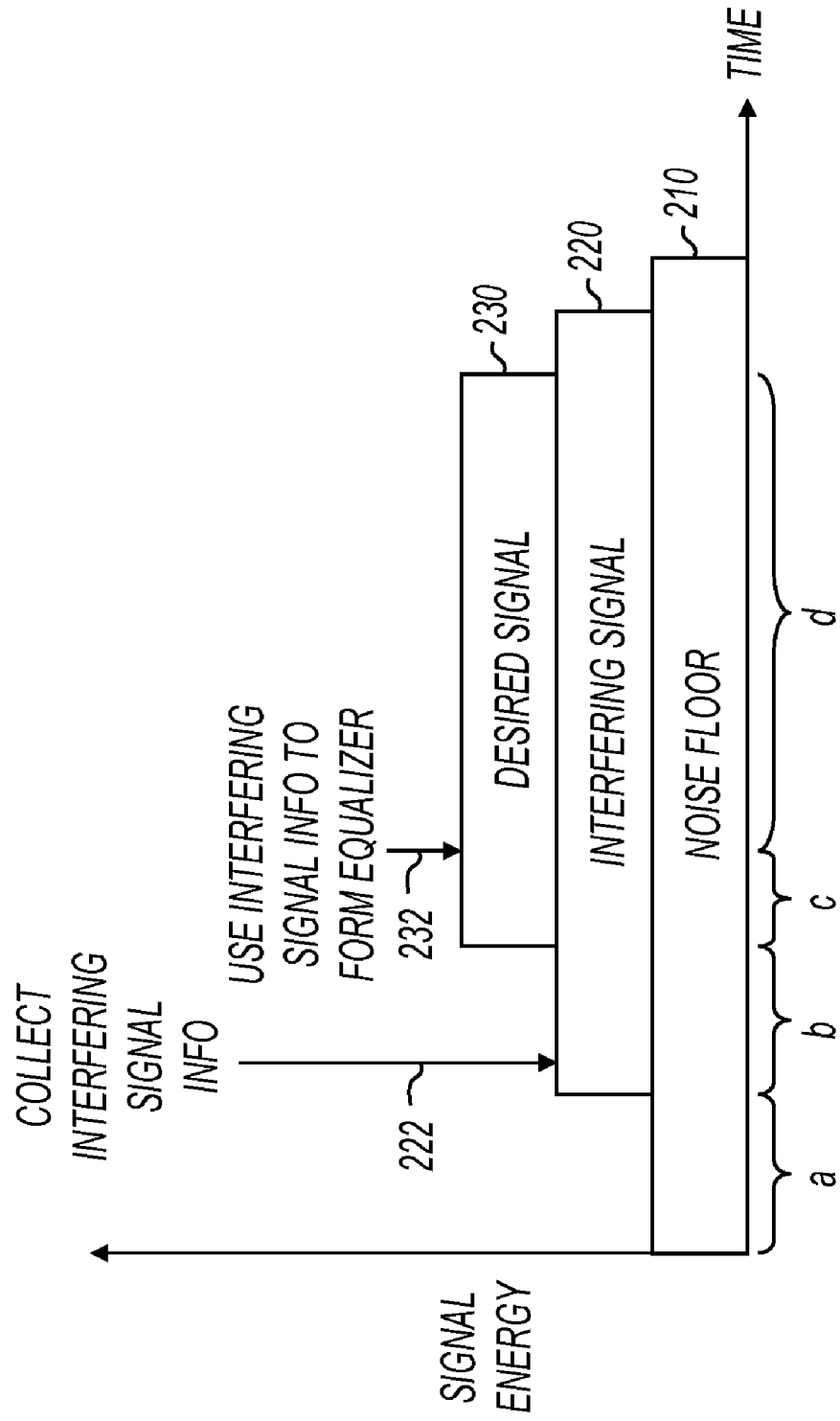
FIG. 2 shows an interfering signal and a desired signal over time.

FIG. 2 shows an interfering signal and a desired signal over time. As shown in FIG. 2, the horizontal axis represents the passage of time from left to right, and the vertical axis represents signal energy. The signals shown in FIG. 2 represent signals received by receiver 140 (FIG. 1). A noise floor is shown at 210. Noise floor 210 corresponds to the noise represented by $n_1$, $n_2$, and $n_3$ in FIG. 1. An interfering signal is shown at 220. Interfering signal 220 corresponds to the signal transmitted by interfering signal source 120 (FIG. 1). A desired signal is shown at 230. Desired signal 230 corresponds to signals transmitted by desired signal source 110 (FIG. 1).

Time regions "a", "b", "c", and "d" are defined in FIG. 2. Time region "a" represents the time preceding the arrival of both the interfering signal and the desired signal. Estimation of the spatially uncorrelated noise power may be performed at this time. Time region "b" represents the period of time before the desired signal has arrived but after the interfering signal has arrived. This is the time to estimate the interfering signal and its channel information or spatial covariance. In time period "c" the preamble for the desired signal arrives. The preamble enables the estimation of the channel between the desired transmitters and receivers in the presence of noise and interference.

In the scenario represented by FIG. 2, interfering signal 220 is received prior to desired signal 230. If the interfering signal is recognized as a compatible signal by the receiver, the receiver may begin normal reception of the interfering signal 220 prior to the arrival of the desired signal. The receiver may not yet know that this is not the desired signal. Normal reception will include exploiting the preamble transmission for channel estimation and demodulation of the packet headers. During this period of reception of the interfering signal, the receiver may collect useful information regarding the interfering signal, shown at 222. If the interfering signal is not recognized by the receiver, the receiver may collect useful information regarding the interfering signal and the channel through which it propagated without attempting to understand any contents of the interfering signal.

When the desired signal arrives with a higher signal power, the receiver recognizes the desired signal and begins reception of the desired signal regardless of whether the interfering signal was recognized. A spatial equalizer 130 can be designed using the noise power, channel information and or spatial covariance estimated in time periods "a", "b" and "c". This equalizer at 232 separates the desired signals from each other and the interference enabling demodulation of the transmitted information in time period "d". The information collected about the interfering signal and the channel through which it propagated may be used in the formation of a spatial equalizer at 232 to reject interference caused by the interfering signal.

Referring now back to FIG. 1, interfering signal source 120 may transmit an interfering signal, and receiver 140 may collect information regarding the interfering signal and the channel through which it propagated, whether or not the interfering signal is recognized as a compatible signal. Desired signal source 110 may then transmit a desired signal, and receiver 140 will preempt the reception of the interfering signal to prosecute the desired signal. Receiver 140 may use information describing the received interfering signal and the channel through which it propagated to form spatial equalizer 130 to reduce interference caused by interfering signal source 120.

As described above, the interfering signal may or may not be recognized as a compatible signal by the receiver. In the context of an 802.11 system, an interfering signal may be compatible when an 802.11 preamble is detected. The formation and application of spatial equalizers is now described for embodiments in which the interfering signal is compatible with the receiver, and for embodiments in which the interfering signal is not compatible with the receiver.

Non-Compatible Interfering Signal

Figure 3:
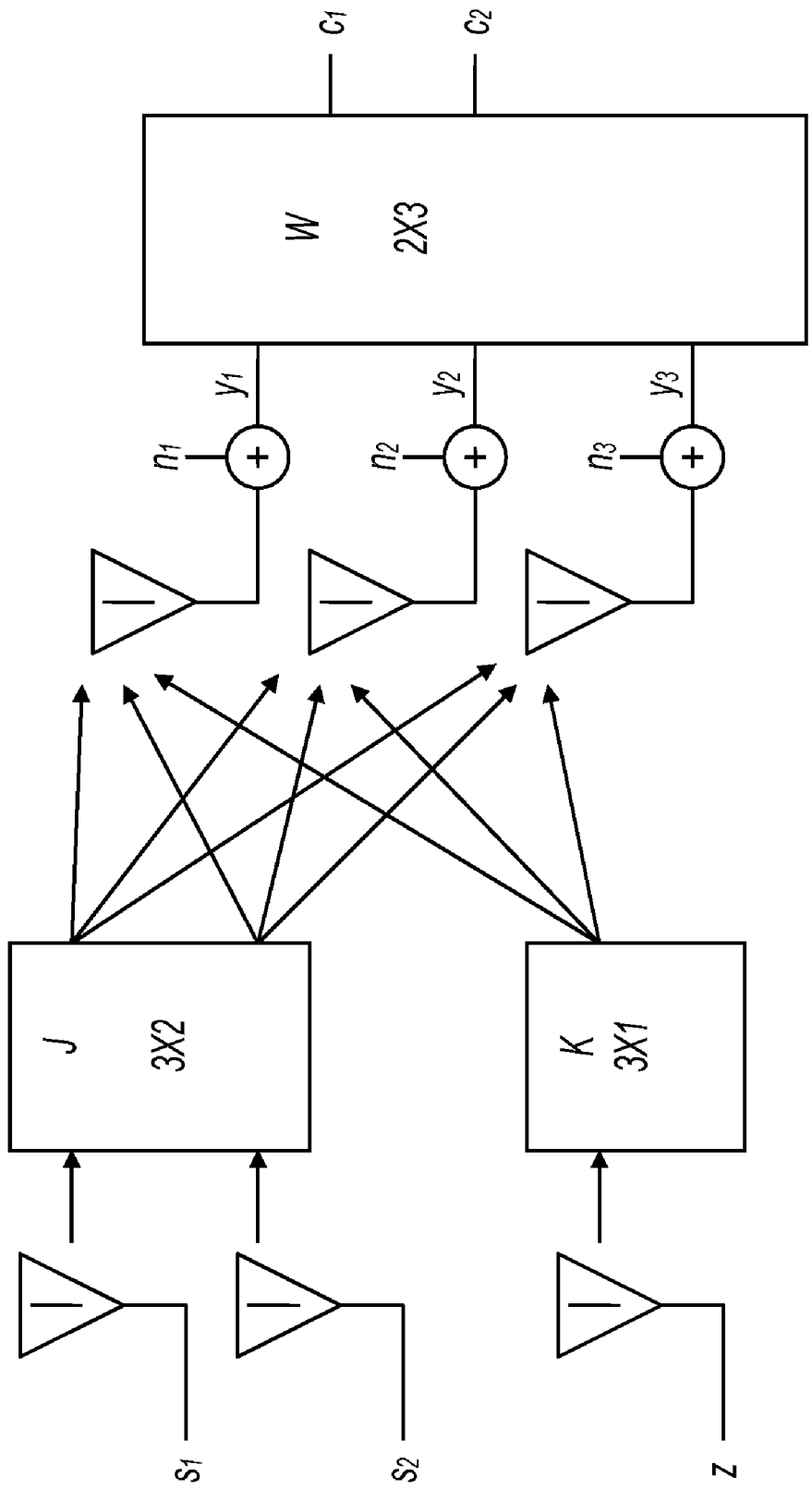
FIG. 3 shows a 3×2 system subject to interference.

FIG. 3 shows a 3×2 system subject to interference. In the scenario represented by FIG. 3, an interfering signal z appears to a three antenna receiver first, and then a desired signal $s_1$, $s_2$, is received at higher power. The interfering signal may be adjacent channel energy from another 802.11 transmitter, a co-channel 802.11 signal from a different BSS, platform noise, or any other noise source, narrow or wide band, whose statistics can be considered stationary relative to the life of an 802.11 packet.

In some embodiments, FIG. 3 represents a multiple-input-multiple-output (MIMO) system, however this is not a limitation of the present invention. For example, the multi-antenna receiver shown in FIG. 3 may receive any number of signals from any number of spatial streams.

The receiver detects the arrival of new energy but its detection circuit, which is designed to reject interference, does not indicate the presence of an 802.11 packet. This corresponds to interfering signal 220 (FIG. 2) arriving at the receiver. The receiver turns on its Fast Fourier Transform (FFT) engines (one for each antenna) and begins collecting the received energy for each OFDM sub-carrier. This corresponds to collecting interfering signal information at 222 (FIG. 2) where the interfering signal information includes received energy for each OFDM sub-carrier. This data is used to estimate the 3×3 noise covariance matrix R for each sub-carrier. The noise covariance matrix describes the spatial correlation of the noise. This information is used in the creation of a spatial equalizer that will be used to demodulate a signal that arrives before the interference goes away.

When the desired signal is detected by the receiver's detection circuit, acquisition begins and the receiver exploits the training sequence in the desired signal's preamble to estimate the 3×2 channel matrix J which describes the channel between the transmit antennas and the receive antennas. This corresponds to desired signal 230 (FIG. 2) arriving at the receiver. This estimate is performed in the presence of the interference and therefore its quality is somewhat degraded.

The desired signal could be a multiple transmitter 802.11a or 802.11g signal using cyclic delay diversity or it could be a 2 transmitter space frequency coded or multiplexed 802.11n signal. The number of transmitter spatial streams that can be accommodated is a function of the number of antennas at the receiver and the number of interfering spatial streams. The collected data (J and R) is used to form minimum mean squared error (MMSE) equalizer coefficients for each sub-carrier. This corresponds to forming the equalizer using information that describes the interfering signal and the channel through which the interfering signal propagated (232, FIG. 2), as well as signal information that describes the desired signal and the channel through which it propagated. Note that Zero Forcing ZF equalizer coefficients could also be calculated. For brevity, only a MMSE implementation is described.

If the receiver detects the energy of an 802.11 interferer and recognizes it as 802.11, the receiver may estimate the 3×1 channel vector k describing the channel between the interference source and the receiver. In this case interference rejection can also be implemented as described below under the heading "Compatible Interfering Signal."

The channel matrix J describes the channel between the three receive antennas and the two desired transmit antennas. The channel vector k describes the channel between the three receive antennas and the undesired interference source.

The received signal vector $\bar{y}$ is given by:

$$\bar{y}_a = \bar{n};$$
$$\bar{y}_b = \bar{k}z + \bar{n};$$
$$\bar{y}_c = \bar{y}_d = J\bar{s} + \bar{k}z + \bar{n};$$
(1)

where the subscripts a through d represent the time region in which the received signal is being observed and:

$$\bar{y} = \begin{bmatrix} y_1 \\ y_2 \\ y_3 \end{bmatrix}, J = \begin{bmatrix} j_{11} & j_{12} \\ j_{21} & j_{22} \\ j_{31} & j_{32} \end{bmatrix}, \bar{s} = \begin{bmatrix} s_1 \\ s_2 \end{bmatrix}, \bar{k} = \begin{bmatrix} k_1 \\ k_2 \\ k_3 \end{bmatrix}, \bar{n} = \begin{bmatrix} n_1 \\ n_2 \\ n_3 \end{bmatrix}.$$
(2)

The recovered signal at the output of the spatial equalizer is given by:

$$\bar{c} = W\bar{y}_d = WJ\bar{s} + W\bar{k}z + W\bar{n}$$
(3)

where $J\bar{s}$ represents the received desired signal, $\bar{k}z$ represents spatially correlated and colored noise, and $\bar{n}$ represents spatially uncorrelated white noise, and the equalizer W is given by:

$$W = \begin{bmatrix} w_{11} & w_{12} & w_{13} \\ w_{21} & w_{22} & w_{23} \end{bmatrix}$$
(4)

The 2×3 equalizer matrix W is used to isolate the desired signals, $s_1$ and $s_2$, from each other and the interference. The first row extracts $s_1$ and the second row extracts $s_2$. The equalizer is created using the following MMSE formula:

$$W_{2\times 3} = (J')_{2\times 3}[J_{3\times 2}(J')_{2\times 3} + R_{3\times 3}]^{-1}$$
(5)

where J' is the conjugate transpose of J and R is the covariance matrix of the noise which includes spatially correlated and colored interference as well as spatially uncorrelated additive noise. The covariance matrix R is estimated from the interfering signal prior to the desired signals arrival.

The received and MMSE equalized signal includes a signal component, residual cross talk, un-canceled interference and enhanced noise as shown by the following. As shown in (3) above, $\bar{c} = WJ\bar{s} + W\bar{k}z + W\bar{n}$.

Let $$D = WJ = \begin{bmatrix} d_{11} & d_{12} \\ d_{21} & d_{22} \end{bmatrix} \text{ and } \bar{q} = W\bar{k} = \begin{bmatrix} q_1 \\ q_2 \end{bmatrix}$$
(6)

and $\bar{m} = W\bar{n} = \begin{bmatrix} m_1 \\ m_2 \end{bmatrix}.$

Combining (3) and (6) yields:

$$\bar{c} = D\bar{s} + \bar{q}z + \bar{m} = \begin{bmatrix} c_1 \\ c_2 \end{bmatrix}$$
(7)

where $$c_1 = d_{11}s_1 + d_{12}s_2 + q_1 z + m_1$$
(8)
and
$$c_2 = d_{21}s_1 + d_{22}s_2 + q_2 z + m_2$$

where $d_{11}$ and $d_{22}$ are the diagonal of the D matrix and represent the desired signal components; $d_{12}$ and $d_{21}$ are the off-diagonal of the D matrix and represent residual crosstalk; $q_1$ and $q_2$ are the elements of q and represent residual interference; and $m_1$ and $m_2$ are the elements of m and represent enhanced noise.

The residual interference q, together with the enhanced noise m, may be used to determine confidence weights applied to soft bits input to a convolutional decoder. For example, knowledge of the signal-to-interference-plus-noise ratio (SINR) for each sub-carrier may be used to demodulate to the optimal soft bits. These SINR values can be calculated as:

$$SINR_1 = \frac{|d_{11}|^2}{|d_{12}|^2 + |q_1|^2 + |m_1|^2} \text{ and}$$
(8)
$$SINR_2 = \frac{|d_{22}|^2}{|d_{21}|^2 + |q_2|^2 + |m_2|^2}$$

however, this implies that k must be known to compute $q_1$ and $q_2$ because $$\bar{q} = W\bar{k} = \begin{bmatrix} q_1 \\ q_2 \end{bmatrix}$$

as shown above at (6). Various embodiments of the present invention recognize that the amount of interference remaining after equalization can be determined utilizing the absolute magnitude of the k vector and relative phases of the elements in the k vector, without having complete knowledge of k. Let $\tilde{k}$ be a vector having absolute magnitude and relative phases of k. $\tilde{k}$ can be computed as follows:

$$\tilde{k} = \frac{\bar{r}}{\sqrt{r_{11}}}$$
(10)

where

-continued $$\tilde{r} = r^{(1)} - \begin{bmatrix} \sigma_n^2 \\ 0 \\ 0 \end{bmatrix} \quad (11)$$

Where $\sigma_n^2$ equals the power of the spatially uncorrelated noise at the receiver, and $$r^{(1)} = \begin{bmatrix} r_{11} \\ r_{21} \\ r_{31} \end{bmatrix} \text{ is the first column of } R_{3\times 3} \quad (12)$$

where $$\begin{aligned} R_{3\times 3} &= \begin{bmatrix} r_{11} & r_{12} & r_{13} \\ r_{21} & r_{22} & r_{23} \\ r_{31} & r_{32} & r_{33} \end{bmatrix} \\ &= E\{\overline{y}_b \overline{y}_b'\} \\ &= E\left\{ \begin{bmatrix} y_{b1}y_{b1}^* & y_{b1}y_{b2}^* & y_{b1}y_{b3}^* \\ y_{b2}y_{b1}^* & y_{b2}y_{b2}^* & y_{b2}y_{b3}^* \\ y_{b3}y_{b1}^* & y_{b3}y_{b2}^* & y_{b3}y_{b3}^* \end{bmatrix} \right\} \\ &= \begin{bmatrix} k_1 k_1^* + \sigma_n^2 & k_1 k_2^* & k_1 k_3^* \\ k_2 k_1^* & k_2 k_2^* + \sigma_n^2 & k_2 k_3^* \\ k_3 k_1^* & k_3 k_2^* & k_3 k_3^* + \sigma_n^2 \end{bmatrix} \end{aligned} \quad (13)$$

and $$\overline{y}_b = \overline{k}x + \overline{n} \quad (14)$$

Various embodiments of the present invention substitute $\tilde{k}$ for k in the calculation of q in the above soft bit calculations without loss of performance.

Using the above described embodiments, a unique spatial equalizer (beam-former) may be generated for each sub-carrier. This may be useful in frequency selective channels where time domain beam forming would be of very limited value without a huge number of taps.

Figure 4:
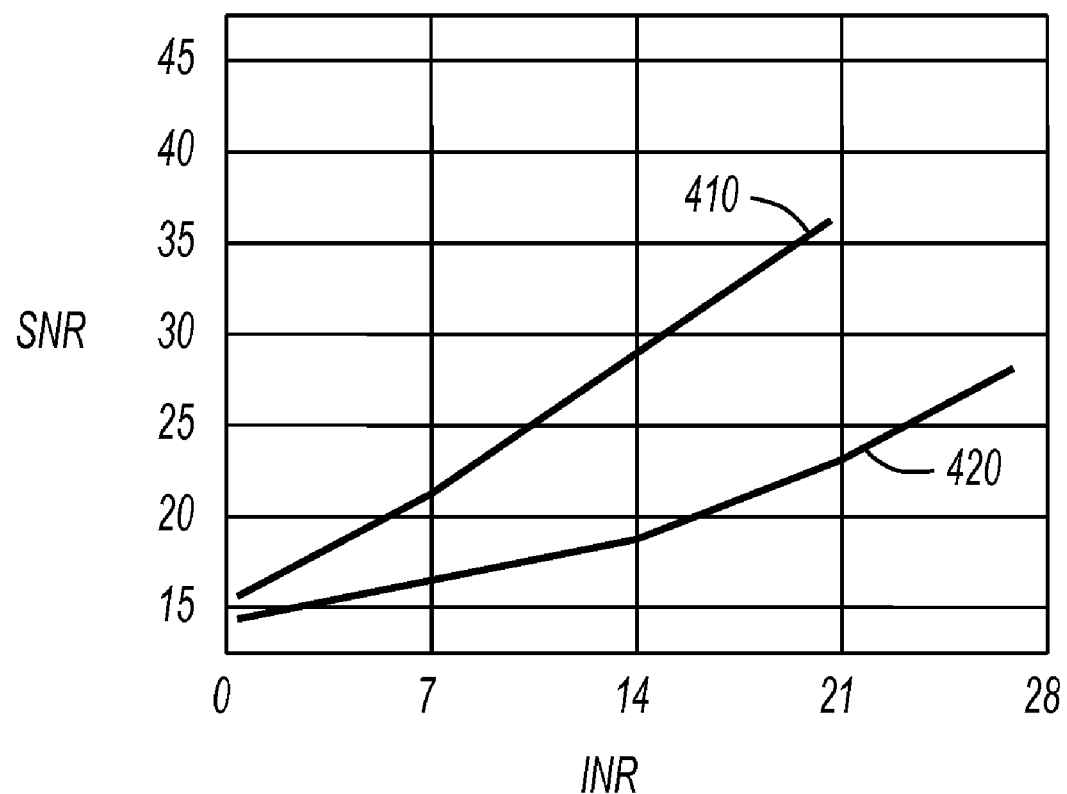
FIG. 4 shows simulation results.

FIG. 4 shows simulation results with and without the rejection technique described above. The x-axis is Interference to Noise Ratio (INR) and the y-axis is average Signal to Noise Ratio (SNR). The simulation environment is consistent with the scenario shown in FIG. 3. The receiver has three antennas with base-band frequency domain combining. The interferer is an undetected co-channel 802.11 (a,g) signal. Note that the interference source could be something other than an 802.11 signal as stated earlier. Also note that if the 802.11 interfering signal was detected, the channel vector k could be estimated by means of the conventional training process and the solution could be obtained as described below under the heading "Compatible Interfering Signal." The performance shown in FIG. 4 also applies to embodiments where the channel vector k is estimated as described below under the heading "Compatible Interfering Signal."

The simulated channel between the interference source and the receiver is a Rayleigh channel with 75 ns delay spread. The channel between the desired transmitter and the receiver is a Rayleigh channel with 75 ns delay spread. The signal transmitted is a 48 Mbps space frequency coded transmission (two spatial streams of 24 Mbps).

Trace 410 shows performance when the proposed interference rejection technique is not used. Specifically it shows how much SNR on average is required for successful demodulation with interference of a given power. Trace 420 shows simulated performance when the rejection technique described above is used. The benefit can be viewed in two ways. First, consider an interference with INR of 14 dB. Without rejection, an average SNR of 28 dB is required for successful demodulation. With rejection, only 18 dB is required. This shows a 10 dB SNR benefit. Another way to view the benefit is to consider that you have received a 28 dB SNR signal. Then without rejection, demodulation can tolerate interference with 14 dB INR. With rejection, demodulation can tolerate interference with 26 dB INR. This shows a 12 dB INR benefit.

Compatible Interfering Signal

Various embodiments of the present invention utilize 802.11 OFDM receivers having multiple antennas whose outputs are combined digitally at base band. The combining is done in the frequency domain (at the output of the FFT) enabling unique combining for each sub-carrier. Frequency domain combining is powerful and may significantly extend the receivers' range. Such a receiver may detect distant transmitters and may not know when a transmitter is outside its basic service set (BSS). When the receiver is prosecuting a packet from outside its BSS, it may leave a signal detector running to detect additional incoming signals so as to not be blind to transmissions from within its BSS.

By leaving a signal detector running, the receiver may allow detection and prosecution of arriving signals with greater power. When a stronger signal arrives, the receiver discontinues demodulation of the weaker packet (the preempted packet) and begins acquisition and demodulation of the stronger packet. In some embodiments, it may not be possible to successfully demodulate the first signal in the presence of the stronger new arrival, so there is no performance penalty associated with preemption.

In this scenario, the preempted packet is interference to the desired stronger packet. Various embodiments of the present invention exploit the information captured during acquisition processing of the preempted packet in the formation of the spatial equalizer for the purpose of interference rejection. The relevant information captured may include the channel estimate, frequency error and signal length.

The order of signals arriving at the receiver is shown in FIG. 2. In this scenario, interfering signal 220 may be a legacy 802.11 (a or g) signal appearing to a three antenna receiver first. Note that the receiver may have more than three antennas. The signal is from a different BSS and is not intended for the receiver. The receiver does not know this and begins prosecuting the signal. The receiver estimates the 3×1 channel vector k between the undesired transmitter and each of its three antennas. See FIG. 3. The receiver also estimates the frequency error $\Delta f_p$ between the clocks. The receiver may or may not read the signal field and extract the length field prior to the arrival of the desired signal. An 802.11n receiver can synchronize with and read the signal field because the 802.11n receiver is backward compatible with earlier 802.11 standards.

The desired signal (230, FIG. 2) arrives with greater power. The desired signal could be any compatible signal including a multiple transmitter 802.11a or 802.11g signal using cyclic delay diversity or a two transmitter space frequency coded or multiplexed 802.11n signal. (Note: The number of transmitter spatial streams that can be accommodated is a function of the number of antennas at the receiver and the number of interfering spatial streams.) Preemption occurs and the receiver begins acquisition of the desired, stronger signal. The receiver estimates the 3×2 channel matrix J which describes the channel between the two transmit antennas and the three receive antennas. See FIG. 3. The receiver also estimates the frequency error $\Delta f_d$ between the clocks. The receiver may also read the signal field and extract the length field. The collected data (k, J, $\Delta f_p$, $\Delta f_d$) is used to form the MMSE equalizer coefficients for each sub-carrier. Note that Zero Forcing ZF equalizer coefficients could also be calculated. For brevity, this disclosure discusses the MMSE implementation only.

Note that if the receiver detects the energy of the interferer but does not recognize it as a compatible signal (in this example, an 802.11 signal), it will not estimate the channel vector k. In this case interference rejection can still be implemented as described above under the heading "Non-Compatible Interfering Signal."

Various signal models may be used to demonstrate the rejection of interference caused by a compatible signal. Two signal models are now described, referred to as signal model A, and signal model B. Signal model A is shown in FIG. 3, and views the interference as a spatially correlated noise source. The channel matrix J describes the channel between the three receive antennas and the two desired transmit antennas. The channel vector k describes the channel between the three receive antennas and the interfering transmit antenna. The 2×3 equalizer matrix W is used to isolate the desired signals, $s_1$ and $s_2$ from each other and the interference. The first row extracts si and the second extracts $s_2$.

If the problem is viewed according to signal model A, the following MMSE formula may be used:

$$W_{2\times3} = (J')_{2\times3} [J_{3\times2}(J')_{2\times3} + R_{3\times3}]^{-1} \quad (15)$$

$$R_{3\times3} = k_{3\times1}(k')_{1\times3} + \sigma_n^2 I_{3\times3}$$

The R represents the covariance matrix of the noise which consists of spatially correlated and colored interference as well as spatially uncorrelated additive noise.

Figure 5:
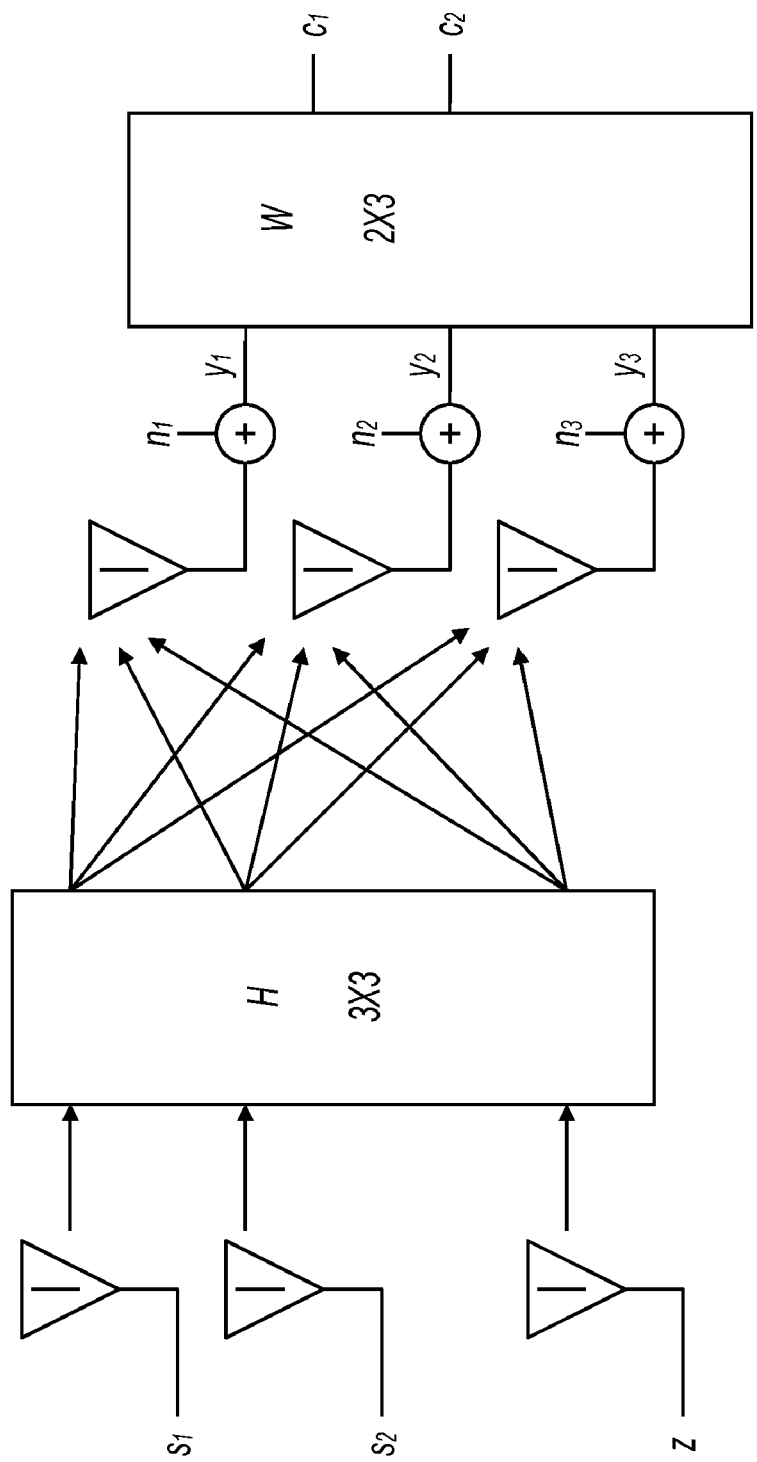
FIG. 5 shows a 3×2 system subject to interference.

Signal model B is shown in FIG. 5. In some embodiments, FIG. 5 represents a multiple-input-multiple-output (MIMO) system, however this is not a limitation of the present invention. For example, the multi-antenna receiver shown in Figure may receive any number of signals from any number of spatial streams. The signal model of FIG. 5 views the interference as a third transmit stream that does not need to be demodulated. In this view, the channel matrix is 3×3 and is formed by concatenating J and k. The equalizer matrix becomes a 3×3 matrix. The third row, however, is not required as it extracts the interference from the desired signal and we do not care to demodulate the interference.

If the problem is viewed according to signal model B, the following formula may be used:

$$W_{3\times3} = H'_{3\times3}(H_{3\times3}H_{3\times3} + \sigma_{n2}I_{3\times3})^{-1} \quad (16)$$

In this approach there is no interference, just a third spatial stream that we will choose not to demodulate. Therefore there is no need to calculate the third row of W.

The received signal vector $\bar{y}_d$ at the input to the spatial equalizer is:

$$\bar{y}_d = J\bar{s} + \bar{k}z + \bar{n} = H\bar{x} + \bar{n} \quad (17)$$

where $$\bar{y}_d = \begin{bmatrix} y_{d1} \\ y_{d2} \\ y_{d3} \end{bmatrix}, H = [J \ \bar{k}] = \begin{bmatrix} j_{11} & j_{12} & k_1 \\ j_{21} & j_{22} & k_2 \\ j_{31} & j_{32} & k_3 \end{bmatrix}, \quad (18)$$

$$\bar{x} = \begin{bmatrix} s_1 \\ s_2 \\ z \end{bmatrix}, \bar{n} = \begin{bmatrix} n_1 \\ n_2 \\ n_3 \end{bmatrix}.$$

The recovered signal at the output of the spatial equalizer is given by:

$$\bar{c} = WH\bar{x} + W\bar{n} \quad (19)$$

where the equalizer W is given by:

$$W = \begin{bmatrix} w_{11} & w_{12} & w_{13} \\ w_{21} & w_{22} & w_{23} \\ w_{31} & w_{32} & w_{33} \end{bmatrix} \quad (20)$$

As described above, the third row of W is not required as it extracts the interference from the desired signal and we do not care to demodulate the interference. The two signal models (A and B) produce identical equalizers and lead to flexibility in digital hardware implementation. Soft bit calculations including SINR are the same as described above under the heading "Non-Compatible Interfering Signal."

The channel k was estimated after correcting for the frequency error between the interfering transmitter and the receiver. The channel J was estimated after correcting for the frequency error between the desired transmitter and the receiver. In 802.11 systems, these two clock domains could be as different as 230 KHz. The estimated parameters $\Delta f_p$ and $\Delta f_d$ are used to bring k into the same clock domain as J. If not done, approximately 10-20% of the potential performance benefit may be lost.

Clock domain synchronization is explained in the following manner. Due to the difference in clock domains, k does not describe the channel at the center frequencies of the data sub-carriers in the desired signal. Sub-carrier spacing in 802.11a, and 802.11g is 312.5 KHz. Spacing will likely be unchanged for 802.11n. This means that k describes the channel that may be shifted by as much as 73% (230/312.5) of the sub-carrier spacing from the desired data center frequencies. Interpolation can be used to estimate the channel at the data sub-carrier center frequencies. The absolute phase of channel k does not need to be preserved. Only relative phases are important and they may be preserved in a straight forward interpolation.

In some embodiments, the duration of the interference is considered. In these embodiments, two sets of equalizer coefficients may be calculated: one for when the interference is present and one for when it is not. The applied coefficients may then be swapped at the moment the interference goes away.

Figure 6:
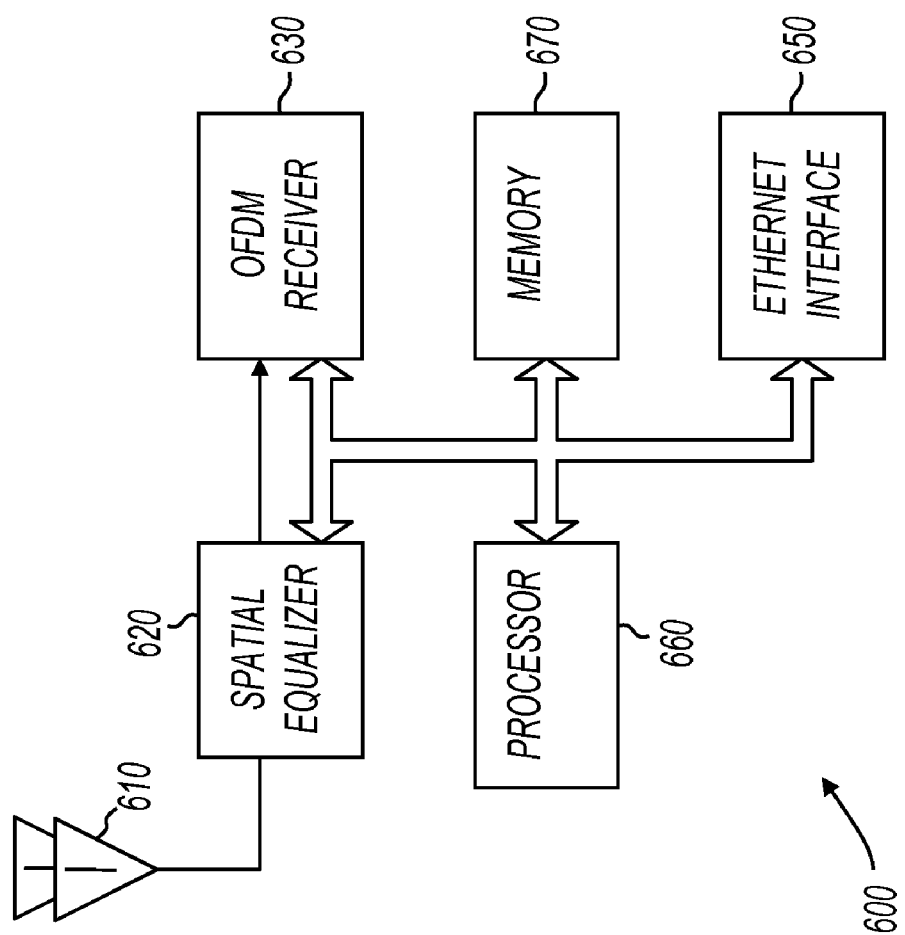
FIG. 6 shows a system diagram in accordance with various embodiments of the present invention.

FIG. 6 shows a system diagram in accordance with various embodiments of the present invention. Electronic system 600 includes antennas 610, spatial equalizer 620, orthogonal frequency division multiplexing (OFDM) receiver 630, Ethernet interface 650, processor 660, and memory 670. In some embodiments, electronic system 600 may be a wireless device capable of rejecting interference as described above with reference to the previous figures. For example, electronic system 600 may be utilized in a wireless network as a station or an access point. Also for example, electronic system 600 may be a wireless device capable of performing the calculations shown in any of the equations above.

In some embodiments, electronic system 600 may represent a system that includes an access point or mobile station as well as other circuits. For example, in some embodiments, electronic system 600 may be a computer, such as a personal computer, a workstation, or the like, that includes an access point or mobile station as a peripheral or as an integrated unit. Further, electronic system 600 may include a series of access points that are coupled together in a network.

In operation, system 600 sends and receives signals using antennas 610, and the signals are processed by the various elements shown in FIG. 6. Antennas 610 may be an antenna array or any type of antenna structure that supports MIMO processing. System 600 may operate in partial compliance with, or in complete compliance with, a wireless network standard such as an 802.11 standard.

Spatial equalizer 620 may be any of the spatial equalizer embodiments described above. For example, spatial equalizer 620 may be any of the spatial equalizers shown in FIGS. 1, 3, or 5, and may implement any of the equalizers represented above as W. OFDM receiver 630 receives recovered signals from spatial equalizer 620 and performs further processing. For example, OFDM receiver may perform fast Fourier transforms (FFTs), demodulation, deinterleaving, or the like.

System 600 may include other blocks that are not shown. For example, system 600 may include low noise amplifiers (LNA), filters, frequency conversion or the like. Further, in some embodiments, system 600 includes circuits to support frequency up-conversion, and RF transmitters.

In operation, processor 660 reads instructions and data from memory 670 and performs actions in response thereto. For example, processor 660 may access instructions from memory 670 and perform method embodiments of the present invention, such as method 700 (FIG. 7) or methods described with reference to other figures. Processor 660 represents any type of processor, including but not limited to, a microprocessor, a digital signal processor, a microcontroller, or the like.

Memory 670 represents an article that includes a machine readable medium. For example, memory 670 represents a random access memory (RAM), dynamic random access memory (DRAM), static random access memory (SRAM), read only memory (ROM), flash memory, or any other type of article that includes a medium readable by processor 660. Memory 670 may store instructions for performing the execution of the various method embodiments of the present invention. Memory 670 may also store coefficients for spatial equalizer 620.

Although the various elements of system 600 are shown separate in FIG. 6, embodiments exist that combine the circuitry of processor 660, memory 670, and Ethernet interface 650 in a single integrated circuit. For example, memory 670 may be an internal memory within processor 660 or may be a microprogram control store within processor 660. In some embodiments, the various elements of system 600 may be separately packaged and mounted on a common circuit board. In other embodiments, the various elements are separate integrated circuit dice packaged together, such as in a multi-chip module, and in still further embodiments, various elements are on the same integrated circuit die.

Ethernet interface 650 may provide communications between electronic system 600 and other systems. For example, in some embodiments, electronic system 600 may be an access point that utilizes Ethernet interface 650 to communicate with a wired network or to communicate with other access points. Some embodiments of the present invention do not include Ethernet interface 650. For example, in some embodiments, electronic system 600 may be a network interface card (NIC) that communicates with a computer or network using a bus or other type of port.

Figure 7:
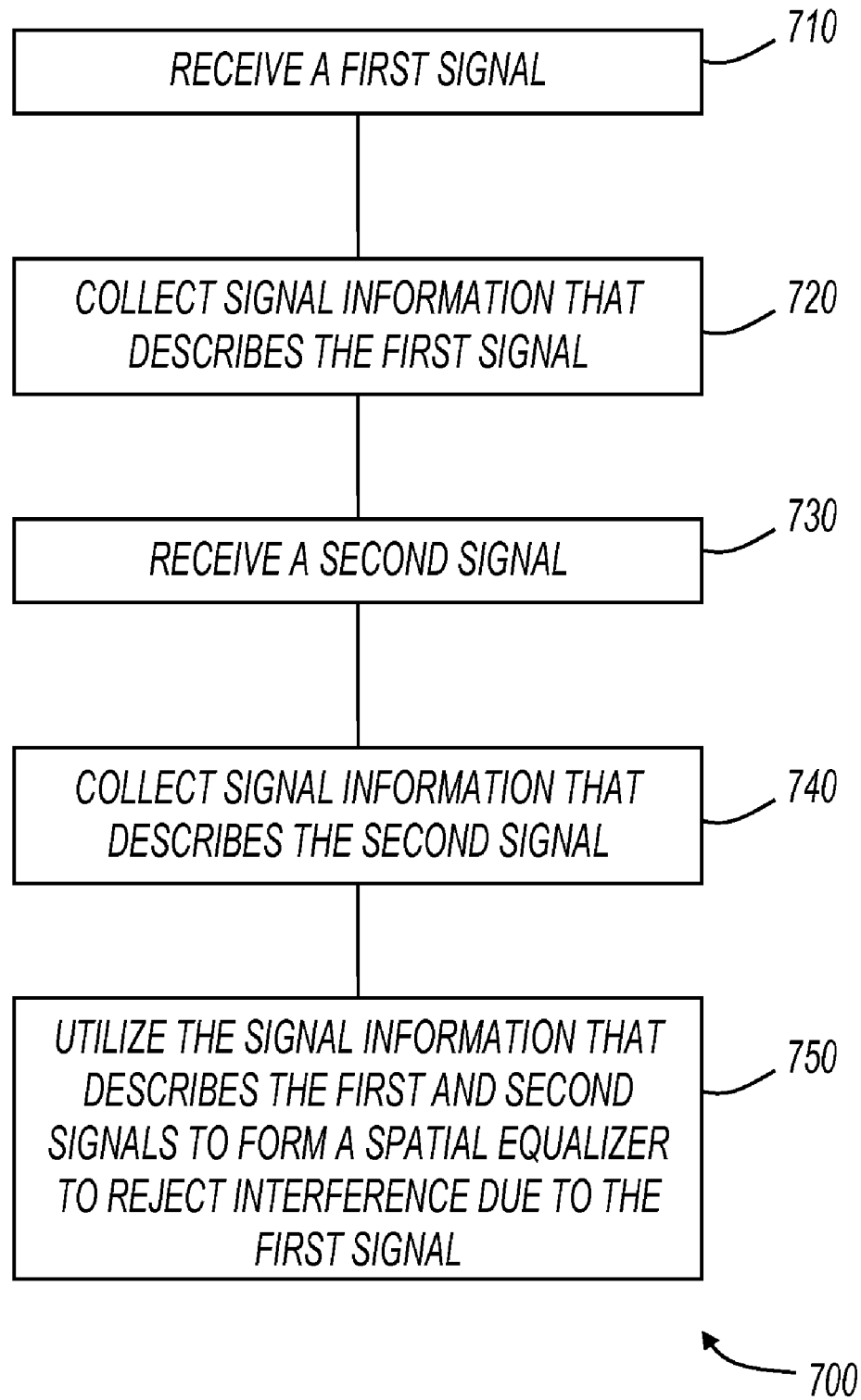
FIG. 7 shows a flowchart in accordance with various embodiments of the present invention.

FIG. 7 shows a flowchart in accordance with various embodiments of the present invention. In some embodiments, method 700 may be used in, or for, a wireless network device to reduce interference. In some embodiments, method 700, or portions thereof, is performed by a wireless receiver, embodiments of which are shown in the various figures. In other embodiments, method 700 is performed by a processor or electronic system. Method 700 is not limited by the particular type of apparatus or software element performing the method. The various actions in method 700 may be performed in the order presented, or may be performed in a different order. Further, in some embodiments, some actions listed in FIG. 7 are omitted from method 700.

Method 700 is shown beginning at block 710 in which a first signal is received. The first signal corresponds to interfering signal 220 (FIG. 2). The first signal may or may not be compatible with the receiver. For example, the receiver may be an 802.11 compatible device, and the first signal may or may not be an 802.11 compatible signal.

At 720, information that describes the first signal is collected. The amount and type of information collected may depend on many factors. For example, in some embodiments, the first signal may not be compatible with the receiver, and the receiver may be limited to collecting signal energy. In OFDM embodiments, the receiver may collect signal energy for multiple sub-carriers. From this signal energy, the receiver may estimate a covariance matrix.

In other embodiments, the signal may be compatible with the receiver, and the receiver may begin to prosecute the first signal. For example, a MIMO/OFDM receiver may receive a compatible signal, and may collect information that allows the receiver to estimate a channel vector (shown as k in previous figures).

At 730, a second signal is received. The second signal corresponds to desired signal 230 (FIG. 2). At 740, signal information that describes the second signal is collected. For example, information may be collected that allows the receiver to estimate a channel matrix (shows as J in previous figures).

At 750, the signal information that describes the first and second signals is utilized to form a spatial equalizer to reject interference due to the first signal. For example, in some embodiments, channels J and k may be concatenated to form a spatial equalizer. In other embodiments, k may not be fully known, and the absolute magnitude and relative phases of elements of k may be utilized instead. Method 700 encompasses any of the embodiments described with reference to the previous figures.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   receiving at an 802.11 multiple-input-multiple-output (MIMO) receiver an interfering signal;
   collecting interfering signal information that describes the interfering signal and a channel through which the interfering signal propagated, wherein collecting interfering signal information comprises:
   if the interfering signal is recognized as an 802.11 signal then estimating a channel vector describing the channel through which the interfering signal propagated and estimating a frequency error between a transmitter clock and a receiver clock; and if the interfering signal is not recognized as an 802.11 signal then performing fast Fourier transforms (FFT) on each orthogonal frequency division multiplexing (OFDM) subcarrier to collect received energy for each OFDM sub-carrier, and estimating a noise covariance matrix for each sub-carrier;

receiving a desired signal arriving later than the interfering signal, the desired signal having a higher power than the interfering signal;

collecting desired signal information that describes the desired signal and a channel through which the desired signal propagated; and utilizing the interfering and desired signal information to form a spatial equalizer to reject interference due to the interfering signal, wherein utilizing the interfering and desired signal information to form a spatial equalizer comprises if the interfering signal is not recognized as an 802.11 signal then estimating a channel matrix describing a channel between a source of the desired signal and the receiver; and forming the spatial equalizer from the channel matrix describing the channel between the source of the desired signal and the receiver and the noise covariance matrix.

2. The method of claim 1 further comprising determining from the noise covariance matrix a magnitude and relative phases of a channel vector describing a channel between a source of the interfering signal and the receiver.

3. The method of claim 2 further comprising determining at least one signal to interference-plus-noise ratio (SINR) using the magnitude and relative phase of the channel vector describing the channel between the source of the interfering signal and the receiver.

4. The method of claim 2 further comprising utilizing the magnitude and relative phases to determine residual interference after equalization.

5. The method of claim 4 further comprising utilizing the residual interference to calculate confidence weights to apply to soft bits.

6. The method of claim 1 further comprising if the interfering signal is recognized as an 802.11 signal then utilizing the channel vector describing the channel through which the interfering signal propagated to determine residual interference after equalization.

7. A method comprising:

receiving at an 802.11 multiple-input-multiple-output (MIMO) receiver an interfering signal;

collecting interfering signal information that describes the interfering signal and a channel through which the interfering signal propagated, wherein collecting interfering signal information comprises:

if the interfering signal is recognized as an 802.11 signal then estimating a channel vector describing the channel through which the interfering signal propagated and estimating a frequency error between a transmitter clock and a receiver clock; and if the interfering signal is not recognized as an 802.11 signal then performing fast Fourier transforms (FFT) on each orthogonal frequency division multiplexing (OFDM) subcarrier to collect received energy for each OFDM sub-carrier, and estimating a noise covariance matrix for each sub-carrier;

receiving a desired signal arriving later than the interfering signal, the desired signal having a higher power than the interfering signal;

collecting desired signal information that describes the desired signal and a channel through which the desired signal propagated;

utilizing the interfering and desired signal information to form a spatial equalizer to reject interference due to the interfering signal if the interfering signal is recognized as an 802.11 signal then utilizing the channel vector describing the channel through which the interfering signal propagated to determine residual interference after equalization; and utilizing the residual interference to calculate confidence weights to apply to soft bits.

8. The method of claim 1 wherein collecting desired signal information comprises if the interfering signal is recognized as an 802.11 signal then estimating a second channel matrix to describe spatial channels between a source of the desired signal and the receiver.

9. A method comprising:

receiving at an 802.11 multiple-input-multiple-output (MIMO) receiver an interfering signal;

collecting interfering signal information that describes the interfering signal and a channel through which the interfering signal propagated, wherein collecting interfering signal information comprises:

if the interfering signal is recognized as an 802.11 signal then estimating a channel vector describing the channel through which the interfering signal propagated and estimating a frequency error between a transmitter clock and a receiver clock; and if the interfering signal is not recognized as an 802.11 signal then performing fast Fourier transforms (FFT) on each orthogonal frequency division multiplexing (OFDM) subcarrier to collect received energy for each OFDM sub-carrier, and estimating a noise covariance matrix for each sub-carrier;

receiving a desired signal arriving later than the interfering signal, the desired signal having a higher power than the interfering signal;

collecting desired signal information that describes the desired signal and a channel through which the desired signal propagated, wherein collecting desired signal information comprises if the interfering signal is recognized as an 802.11 signal then estimating a second channel matrix to describe spatial channels between a source of the desired signal and the receiver;

utilizing the interfering and desired signal information to form a spatial equalizer to reject interference due to the interfering signal; and concatenating the channel vector and the second channel matrix, and using a result to form the spatial equalizer.

10. An article comprising a machine-readable medium adapted to hold instructions that when accessed result in a machine performing:

receiving at an 802.11 multiple-input-multiple-output (MIMO) receiver an interfering signal;

collecting interfering signal information that describes the interfering signal and a channel through which the interfering signal propagated, wherein collecting interfering signal information comprises:

if the interfering signal is recognized as an 802.11 signal then estimating a channel vector describing the channel through which the interfering signal propagated and estimating a frequency error between a transmitter clock and a receiver clock, and estimating a first channel matrix describing a spatial channel between a source of the interfering signal and the receiver; and if the interfering signal is not recognized as an 802.11 signal then performing fast Fourier transforms (FFT) on each orthogonal frequency division multiplexing (OFDM) subcarrier to collect received energy for each OFDM sub-carrier, and estimating a noise covariance matrix for each sub-carrier;
receiving a desired signal arriving later than the interfering signal, the desired signal having a higher power than the interfering signal;
collecting desired signal information that describes the desired signal and a channel through which the desired signal propagated, wherein collecting desired signal information comprises estimating a second channel matrix describing a spatial channel between a source of the desired signal and the receiver; and
utilizing the interfering and desired signal information to form a spatial equalizer to reject interference due to the interfering signal, wherein utilizing the interfering and desired signal information to form a spatial equalizer comprises concatenating the first and second channel matrices.

11. An article comprising a machine-readable medium adapted to hold instructions that when accessed result in a machine performing:
   receiving at an 802.11 multiple-input-multiple-output (MIMO) receiver an interfering signal;
   collecting interfering signal information that describes the interfering signal and a channel through which the interfering signal propagated, wherein collecting interfering signal information comprises:
      if the interfering signal is recognized as an 802.11 signal then estimating a channel vector describing the channel through which the interfering signal propagated and estimating a frequency error between a transmitter clock and a receiver clock; and
      if the interfering signal is not recognized as an 802.11 signal then collecting received energy information for each of a plurality of orthogonal frequency division multiplexing (OFDM) sub-carriers, performing fast Fourier transforms (FFT) on each orthogonal frequency division multiplexing (OFDM) subcarrier to collect received energy for each OFDM sub-carrier, and estimating a noise covariance matrix for each OFDM sub-carrier;
   receiving a desired signal arriving later than the interfering signal, the desired signal having a higher power than the interfering signal
   collecting desired signal information that describes the desired signal and a channel through which the desired signal propagated; and
   utilizing the interfering and desired signal information to form a spatial equalizer to reject interference due to the interfering signal, wherein utilizing the interfering and desired signal information to form a spatial equalizer comprises estimating magnitudes and relative phases of a channel matrix describing a spatial channel between a source of the interfering signal and the receiver.

* * * * *

UNITED STATES PATENT AND TRADEMARK OFFICE
CERTIFICATE OF CORRECTION

| | | |
|---|---|---|
| PATENT NO. | : 7,684,529 B2 | Page 1 of 1 |
| APPLICATION NO. | : 11/137940 | |
| DATED | : March 23, 2010 | |
| INVENTOR(S) | : William J. Chimitt et al. | |

It is certified that error appears in the above-identified patent and that said Letters Patent is hereby corrected as shown below:

In column 14, line 6, in claim 7, delete "signal" and insert -- signal; --, therefor.

In column 16, line 18, in claim 11, delete "signal" and insert -- signal; --, therefor.

Signed and Sealed this

Thirty-first Day of August, 2010

David J. Kappos
*Director of the United States Patent and Trademark Office*